United States Patent [19]

Valentine

[11] Patent Number: 4,537,085
[45] Date of Patent: Aug. 27, 1985

[54] PIVOTAL LIFT APPARATUS

[76] Inventor: Al L. Valentine, 21658 Summerdale, Southfield, Mich. 48034

[21] Appl. No.: 460,109

[22] Filed: Jan. 24, 1983

[51] Int. Cl.³ .............................................. F16H 21/44
[52] U.S. Cl. .................... 74/99 A; 74/99 R; 74/107; 901/37
[58] Field of Search ............... 74/99 A, 99 R, 102, 74/104, 107; 901/37

[56] References Cited

U.S. PATENT DOCUMENTS

| | | | |
|---|---|---|---|
| 2,648,351 | 8/1953 | Curtis et al. | 74/104 |
| 3,440,933 | 4/1969 | Sutton | 74/104 |
| 3,482,830 | 12/1969 | Sendoykas | 74/107 |
| 3,570,835 | 3/1971 | McPherson | 74/107 |
| 3,672,262 | 6/1972 | Karr | 74/104 |
| 3,797,324 | 3/1974 | Sheesley et al. | 74/99 R |
| 4,265,132 | 5/1981 | Robertson | 74/104 |

FOREIGN PATENT DOCUMENTS 1069730  1/1980  Canada ............................ 74/99 R Primary Examiner—Allan D. Herrmann
Assistant Examiner—Shirish Desai
Attorney, Agent, or Firm—Krass & Young

[57] ABSTRACT

Apparatus for lifting a load through an arc includes two pivotally connected, overlapping housings which are pivoted relative to each other by a fluid operated piston disposed between the housings. The housings have overlapping sides provided with oppositely inclined cam tracks. Rollers driven by the piston and captured within the cam tracks transmit force between the sidewalls of the housings, thereby causing the housings to pivot relative to each other. One of the housings is adapted to have the load mounted thereon.

12 Claims, 7 Drawing Figures

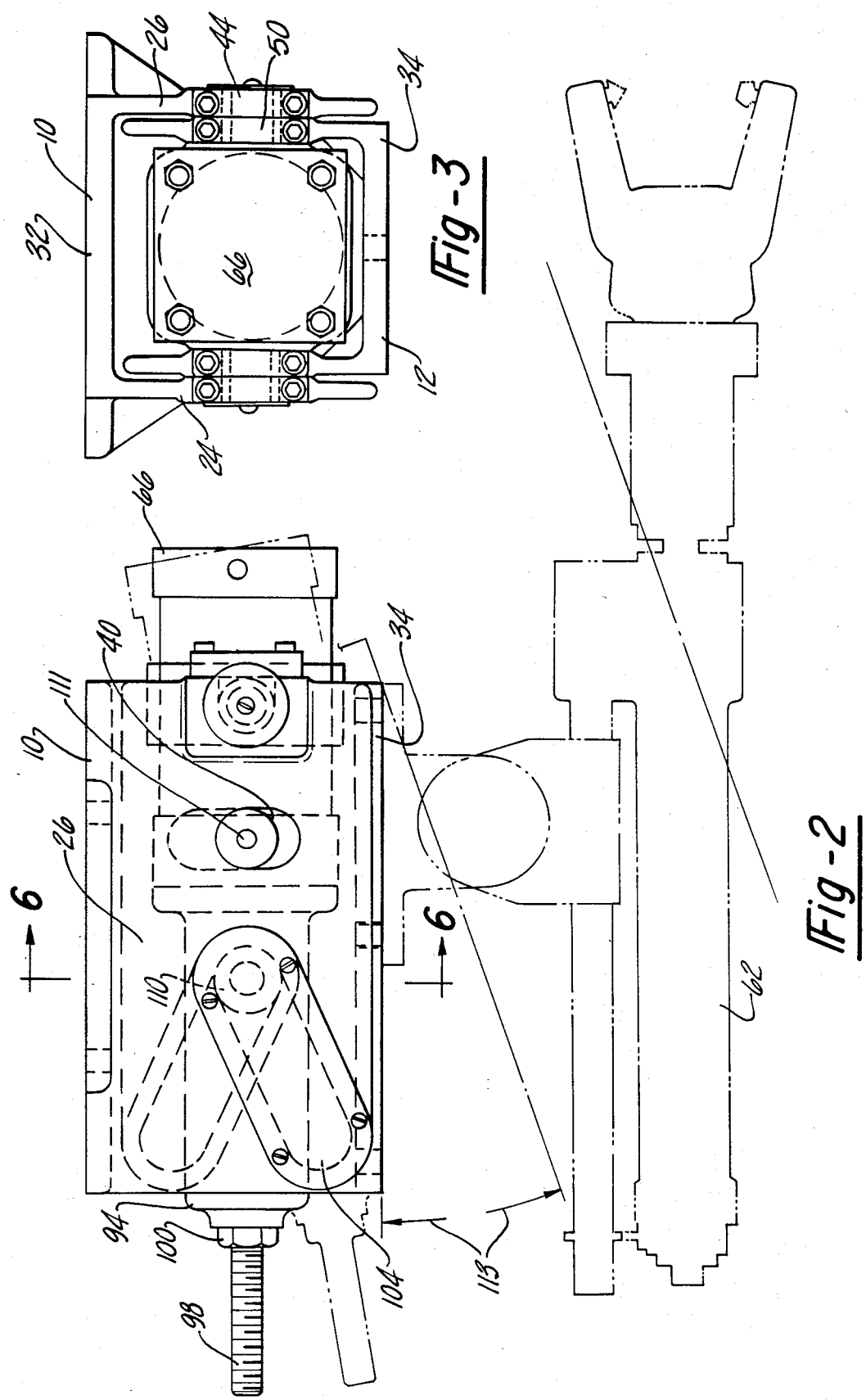

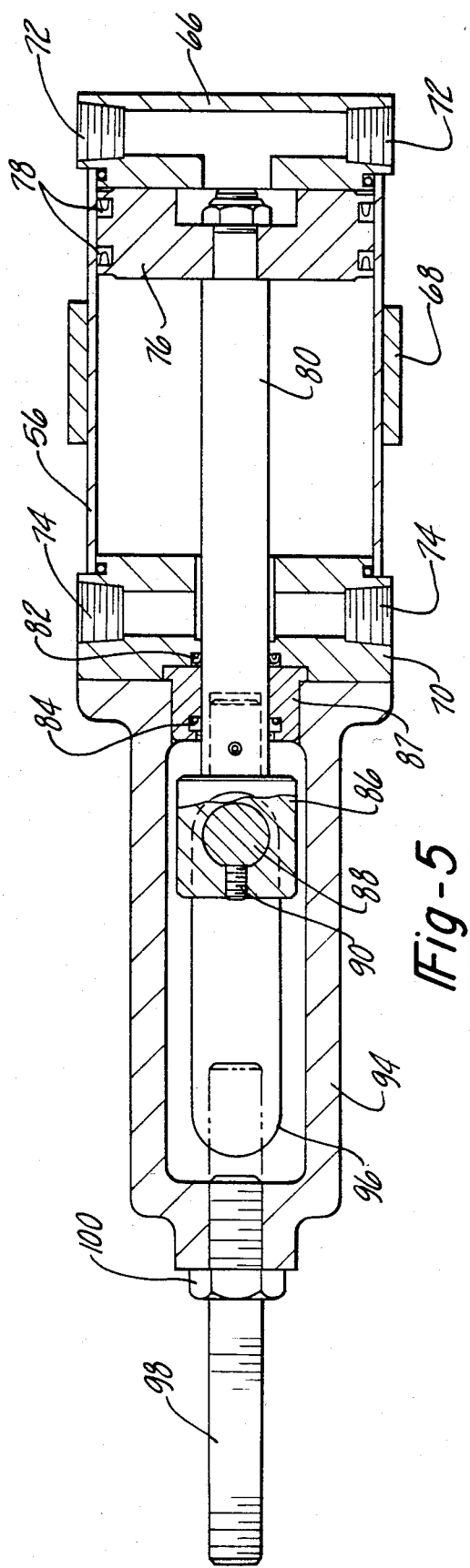
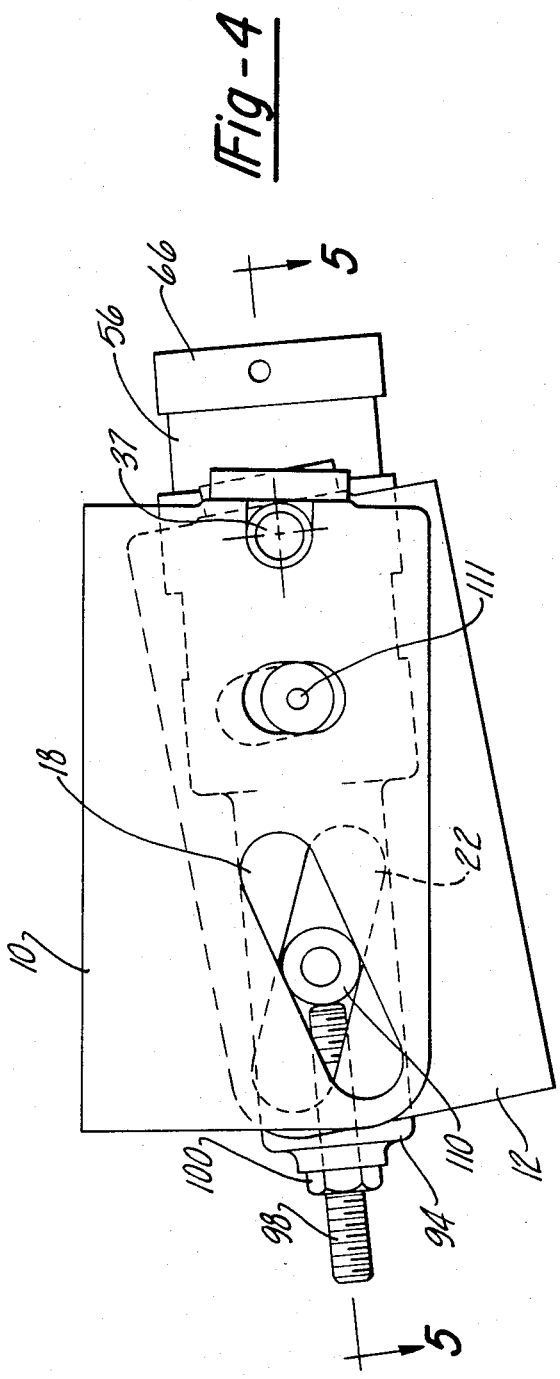

PIVOTAL LIFT APPARATUS

DESCRIPTION

1. Technical Field

The present invention broadly relates to power operated lifting apparatus, and deals more particularly with apparatus for lifting a load through an arcuate path.

2. Background Art

Various types of apparatus have been devised in the past for lifting loads through an arcuate path. Such apparatus is employed where it is necessary not only to alter the elevation of the load but also pivot the load relative to a reference plane. Known prior art devices for lifting a load through an arcuate path are relatively bulky in terms of size and are severely limited in the magnitude of the loads which may be lifted. These limitations have limited the use of the prior art devices in the field of robotic machines where relatively heavy loads must be lifted and the operating mechanisms must be compact in size.

DISCLOSURE OF THE INVENTION

It is therefore a primary object of the present invention to provide apparatus for lifting a load through an arcuate path or arc which is both compact in size and is capable of lifting relatively heavy loads.

A further object of the invention is to provide apparatus as described above which is readily adapted for use with robotic mechanisms.

A still further object of the invention is to provide apparatus as previously described which allows ready adjustment of the arc through which the load is lifted.

Another object of the invention is to provide apparatus of the type mentioned above which is both economical to manufacture and highly reliable in operation.

According to the present invention, the apparatus includes two pivotally connected, overlapping housings which are pivoted relative to each other by a fluid operated piston assembly disposed between the housings. The housings have overlapping sides provided with oppositely inclined cam tracks. Rollers driven by the piston assembly and captured within the cam tracks transmit force between the sidewalls of the housings, thereby causing the housings to pivot relative to each other. One of the housings is adapted to have the load mounted thereon while the other housing may be mounted on a support or a mechanism such as a trolley.

BRIEF DESCRIPTION OF THE DRAWINGS

In the drawings, which form an integral part of the specification and are to be read in conjunction therewith, and in which like components are designated by identical reference numerals in the various views:

FIG. 2 is a side elevational view of the apparatus shown in FIG. 1, the tilted position of the piston assembly and the base of the inner housing being indicated in the phantom;

FIG. 3 is a view of one end of the apparatus shown in FIG. 1;

FIG. 4 is a view similar to FIG. 2 but showing the inner and outer housing having pivoted away from each other;

FIG. 5 is a cross sectional view taken along the line 5—5 in FIG. 4;

BEST MODE FOR CARRYING OUT THE INVENTION

Figure 1:
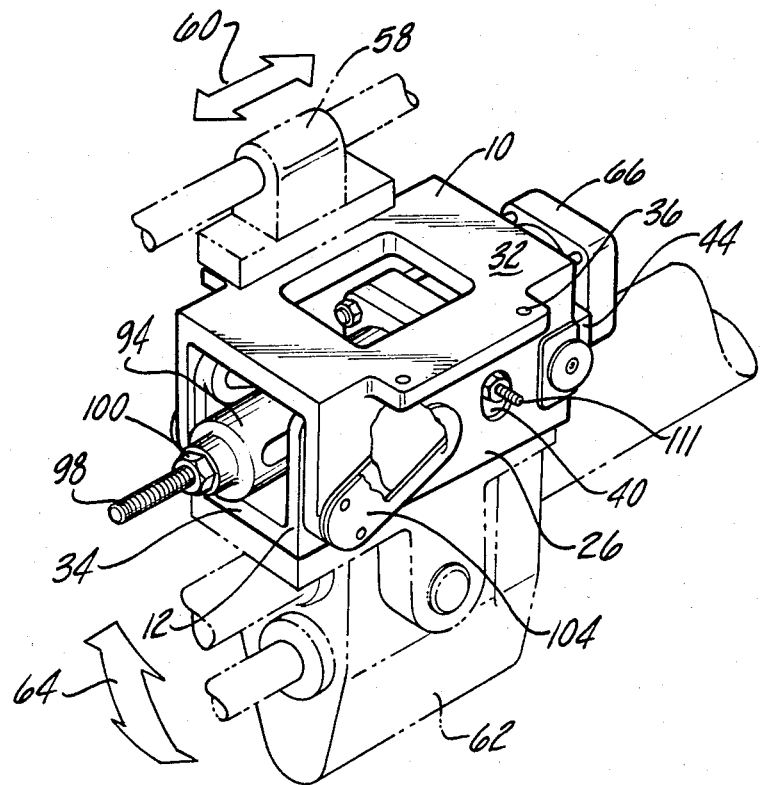
FIG. 1 is a perspective view of the apparatus of the present invention shown in operative relationship to a load and a trolley mount which are indicated in the phantom.

Referring to the drawings, the present invention involves apparatus for lifting a load 62 through an arcuate path or arc relative to a reference plane. The load 62 may comprise virtually any type of mechanism or device which may be, by way of example, a robotic gripping mechanism such as that shown in my co-pending U.S. patent application Ser. No. 374,831, filed May 5, 1982, now U.S. Pat. No. 4,507,045 issue date March 26, 1985.

The apparatus of the present invention broadly comprises an outer housing 10, an inner housing 12, and a piston and cylinder assembly 14 disposed between the inner and outer housings 10 and 12 respectively.

Outer housing 10 includes a base 32 provided with apertures 36 to allow mounting of the apparatus to a bracket 58 of a trolley or the like permitting movement of the apparatus in the direction of the arrows 60. However it can be appreciated that the apparatus may be mounted on any suitable support, either movable or stationary. Outer housing 10 further includes spaced apart, essentially parallel sidewalls 24 and 26 depending downwardly from base 32. Sidewalls 24 and 26 are provided with downwardly inclined cutouts defining cam tracks 16, 18 adjacent the forward end thereof. A pair of openings 40 in sidewalls 24, 26 are provided intermediate the ends of the sidewalls 24, 26 for purposes which will become later apparent. The other end of the sidewalls 24, 26 is provided with a cutout 42 for receiving bushings 106 through which there are sleeved later discussed trunnions 37. Bushings 106 and trunnions 37 are held within the cutout 42 by means of a retainer block 44 secured to the corresponding sidewalls 24, 26 by cap screws 46.

The inner housing 12 includes a substantially flat base 34 and upwardly depending, spaced apart, essentially parallel sidewalls 28 and 30 which are respectively disposed immediately inboard of sidewalls 24, 26 of the outer housing 10. The base 34 is provided with threaded apertures 38 to allow connection with the load 62. The forward end of sidewalls 28, 30 are provided with upwardly inclined cutouts forming cam tracks 20, 22 which overlap and are inclined in the opposite direction (i.e. oblique) to the cam tracks 16, 18 in outer housing 10. Sidewalls 28, 30 are provided with intermediate openings 54 aligned with openings 40 in outer housing 10, as well as a pair of cutouts 48 aligned with cutouts 42, which receive bushings 106 secured in place by retainer blocks 50 and cap screws 52.

The piston and cylinder assembly 14 includes a tubular cylinder 56 closed at the opposite ends thereof by headers 66 and 70 which are secured together by longitudinally extending bolts 102. A pair of trunnions 37 are mounted on opposite sides of an intermediate bracket 68 surrounding cylinder 56 and secured by bolts 102. A piston 76 is reciprocably mounted within cylinder 56 and has secured thereto a longitudinally extending piston rod 80 which extends through an aperture in header 70. Fluid is introduced into the rear end of cylinder 56 through ports 72 and through the other end thereof via ports 74. A pair of seals 78 in piston 76 form a pressure seal against the interior wall of cylinder 56. Fluid is prevented from escaping through the forward end of the cylinder around piston rod 80 by means of an annular seal 82 and wiper 84. A tubular guide 94 is mounted by any suitable means on the header 70 and is provided with a transverse, longitudinally extending slot 96 within which there is received the outer end of piston rod 80.

A transversely extending roller shaft 88 is mounted on the outer end of piston rod 80 by a coupling member 86 and a set screw 90 which bears against a flat 92 in shaft 88. Means for limiting the outward displacement of piston rod 80 comprises a threaded stud 98 threadably received within the end of guide tube 94 and adjustably locked in place by means of a nut 100. The inner end of stud 98 extends into the interior of slot 94 and is adapted to engage coupling member 86 when rod 80 is displaced outwardly.

Figure 6:
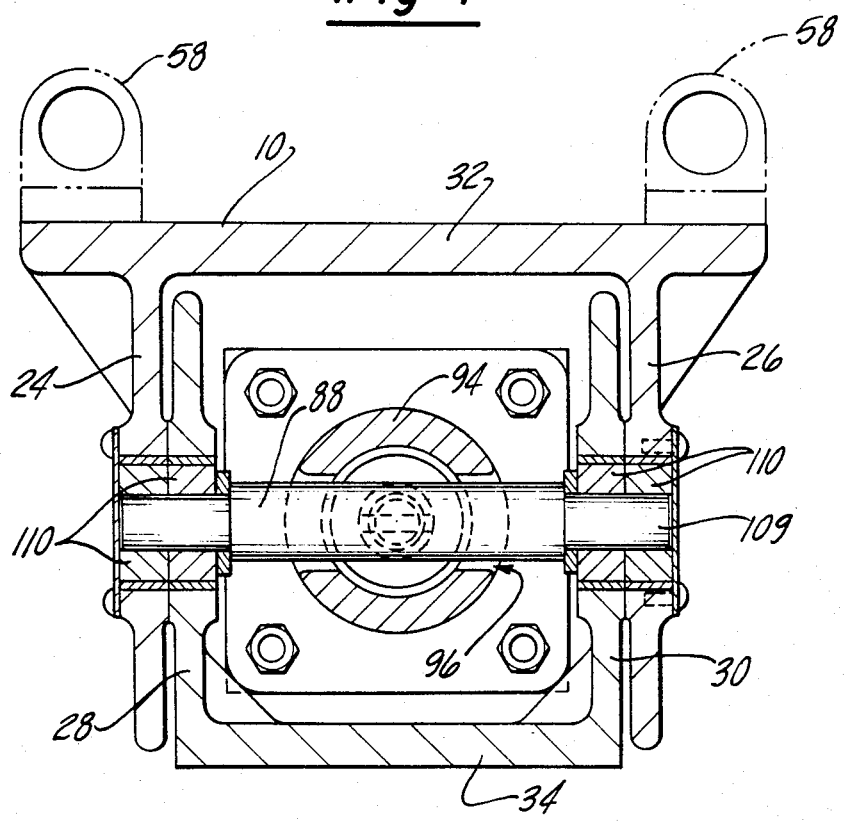
FIG. 6 is a cross sectional view taken along the line 6—6 in FIG. 2.
Figure 7:
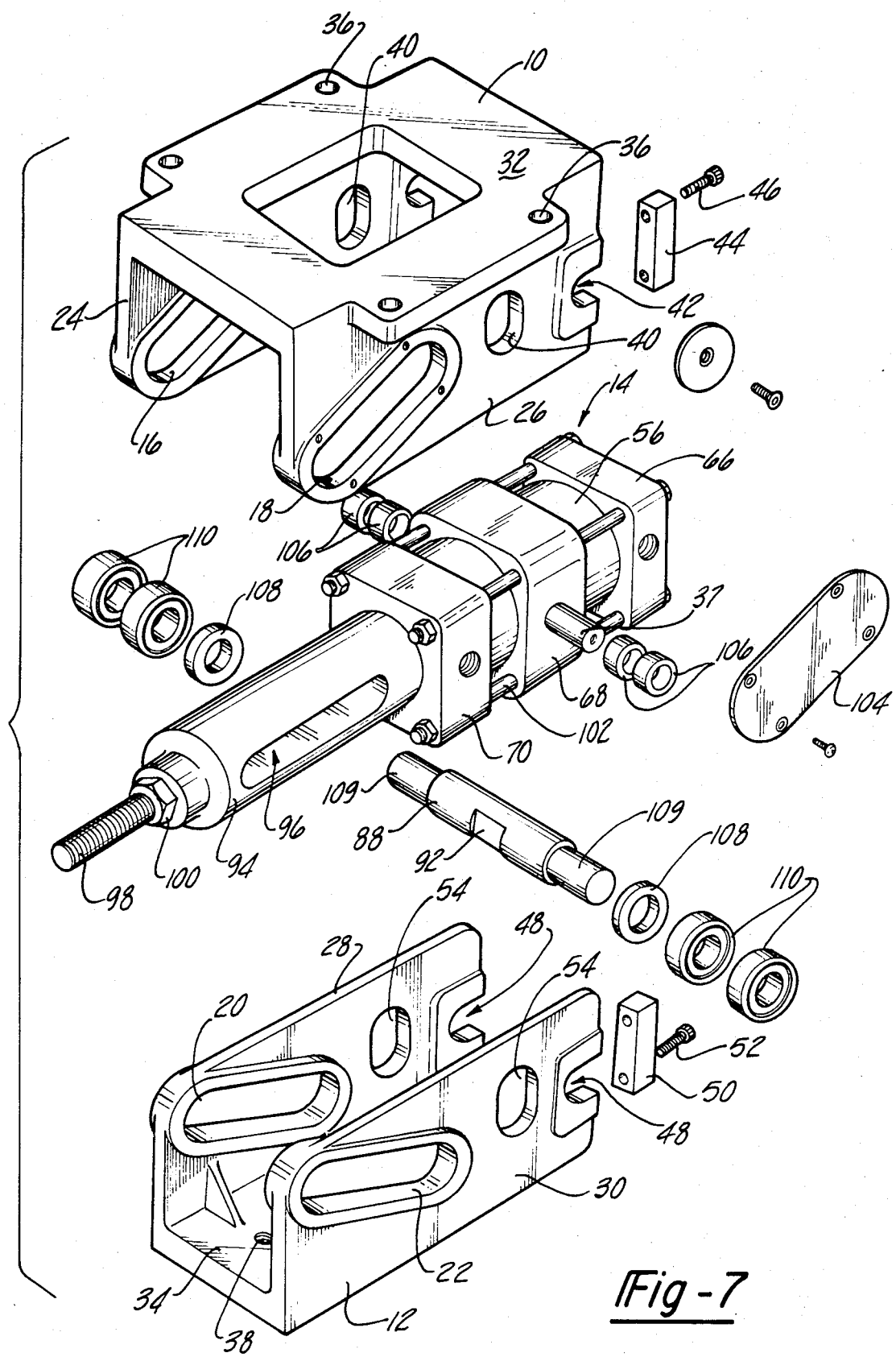
FIG. 7 is a perspective, exploded view of the apparatus shown in FIG. 1.

Roller shaft 88 includes a reduced diameter portion 109 on the opposite ends thereof which receive a pair of corresponding washers 108 and two pairs of ball bearing rollers 110 thereon. Rollers 110 are respectively received within the cam tracks 16, 18, 20 and 22, as best seen in FIG. 6. A cover plate 104 is secured over the outer faces of cam tracks 16 and 18 to protectively cover the rollers 110 from dirt, debris, etc.

The trunnions 37 pivotally mount the piston and cylinder assembly 14 as well as the inner housing 12 for pivotal movement on the outer housing 10. The forward end of the piston and cylinder assembly 14 is supported by means of the shaft 88 and rollers 110 received within the cam tracks 16, 18, 20 and 22.

With the piston 76 in a fully retracted position as shown in FIG. 5, the rollers 110 are disposed at one end of their respective cam tracks (see FIG. 2) and the bases 32, 34 of housings 10, 12 extend essentially parallel to each other, as shown in FIGS. 1–3 and 6. When it is desired to rotate and thereby lift a portion of the load 62, fluid is introduced under pressure into the inlet ports 72 thereby pressurizing one end of the cylinder 56 and forcing piston 76 to extend. Extension of piston rod 80 forces shaft 88 forwardly within the slot 96 thereby displacing rollers 110 forwardly within the corresponding cam tracks 16, 18, 20, 22. The slot 96 prevents axial rotation of rod 80 during both its extension and retraction. In as much as the cam tracks 16 and 18 are inclined in a direction opposite to that of cam tracks 20 and 22 and recalling that the outer housing 10 is prevented again against pivotal movement by virtue of its securement to bracket 58, it can be appreciated that cam tracks 16 and 18 act as guides for rollers 110 and the rollers 110 bear against the sidewalls 28, 30 within cam tracks 20 and 22 thereby imposing a downwardly directed force on the inner housing 12 which causes the latter to pivot about a transversely extending axis through the trunnions 37. Thus, while outer housing 10 remains stationary, both the piston and cylinder assembly 14 and inner housing 12 pivot downwardly through an arc designated by the arrows 113. This pivotal movement of inner housing 12, and thus of load 62 which is attached thereto, continues until the coupling 86 engages the inner end of stud 98 which limits the outward extension of piston rod 80. The point at which the coupling 86 engages stud 98 may be easily adjusted simply by screwing stud 98 in either of its two rotational directions and locking it into place using nut 100. It is readily apparent that the adjustment of stud 98 affects the maximum displacement of piston rod 80 and thus the rotational displacement of inner housing 12.

The openings 40 are slightly elongated to accommodate pivotal displacement fluid couplings 111 mounted in ports 74.

Return pivotal movement of the housings from the position shown in FIG. 4 to that depicted in FIG. 2 is effected merely by allowing escape of fluid through ports 72 and introducing pressurized fluid into ports 74, thereby forcing the piston 76 to retract. Upon retraction of piston 76, rollers 110 are guided by cutouts 16, 18 to their home position while bearing against sidewalls 28, 30, thus transmitting force to the inner housing 12 which causes housing 12 to return to its starting position shown in FIGS. 1–3 and 6.

From the foregoing, it is apparent that the apparatus described above not only provides for the reliable accomplishment of the objects of the invention but does so in a particularly economical and effective manner. It is recognized, of course, that those skilled in the art may make various modifications or additions to the preferred embodiment chosen to illustrate the invention without departing from the scope and spirit of the present contribution to the art. Accordingly, it is to be understood that the protection sought and to be afforded hereby should be deemed to extend to the subject matter claimed and all equivalents thereof fairly within the scope of the invention.

I claim:

1. Apparatus for effecting pivotal movement of a load comprising:

a first housing;

a second housing including means adapted for mounting said load thereon;

means mounting said second housing for pivotal movement on said first housing about a fixed axis;

at least a pair of elongate, overlapping cam tracks respectively defined in said first and second housings, said pair of cam tracks extending obliquely relative to each other;

cam means within said pair of cam tracks for transferring force between said first and second housings causing pivotal movement of said first housing relative to said second housing about said fixed axis in response to displacement of said cam means within said cam tracks; and motor means carried by and pivotally mounted on said housings and coupled with said cam means for displacing said cam means within said cam tracks to cause pivotal movement of said first housing relative to said second housing about said fixed axis.

2. The apparatus of claim 1, wherein:

said first housing includes a first pair of essentially parallel sidewalls, said second housing includes a second pair of sidewalls respectively adjacent to and overlapping said first pair of sidewalls;

said fixed axis is defined adjacent one end of each of said housings; and said pair of cam tracks are respectively defined in one adjacent pair of said sidewalls adjacent the other ends of said housings.

3. The apparatus of claim 2, wherein:

said second pair of sidewalls are disposed outboard of said first pair of sidewalls, and said cam tracks are defined by cutouts in said one adjacent pair of sidewalls.

4. The apparatus of claim 1, wherein said motor means includes:
   a fluid operated piston and a reciprocable piston rod driven by said piston, and
   a shaft extending transversely to and secured to said piston rod, said cam means being mounted on said shaft.

5. The apparatus of claim 4 wherein said motor means includes a cylinder having said piston reciprocally mounted therein and said cylinder is pivotally mounted on said housings for pivotal movement relative to said housings about said fixed axis.

6. The apparatus of claim 4, including means for guiding the movement of said shaft and means for limiting outward movement of said rod relative to said cylinder.

7. The apparatus of claim 6, wherein said guiding means includes elongate structure mounted on one end of said cylinder, said structure having a first elongate opening extending transversely therethrough, said structure having a second opening in one end thereof through which said rod extends, said shaft extending through said first opening.

8. Apparatus adapted to pivotally lift a load mounted thereon, comprising:
   an outer housing including a base and a pair of spaced apart, essentially parallel sidewalls extending away from said base;
   an inner housing including a base opposite said base of said outer housing and a pair of spaced apart, essentially parallel sidewalls respectively disposed inboard of and adjacent to the sidewalls of said outer housing,
   one of said inner and outer housings including means for mounting said load thereto;
   a pair of elongate openings in each adjacent pair of sidewalls of said inner and outer housings adjacent one end of said sidewalls, said openings in each pair thereof extending obliquely to and overlapping each other;
   a fluid operated piston and cylinder assembly disposed within said inner and outer housings, said assembly including a reciprocable output rod;
   means mounting said piston and cylinder assembly and said inner and outer housings for pivotal movement relative to each other about a transversely extending common fixed axis defined adjacent the other end of said sidewalls;
   a shaft secured to and extending transversely to said rod; and
   cam means secured on opposite ends of said shaft and disposed within said openings, said cam means engaging said sidewalls within said openings and transmitting force to said sidewalls causing said inner housing to pivot about said common fixed axis relative to said outer housing.

9. The apparatus of claim 8, including means for preventing rotation of said rod about its longitudinal axis and means for limiting the outward displacement of said rod, said limiting means including means for adjusting the limit of said displacement.

10. The apparatus of claim 9, wherein said limiting means includes an elongate member secured to one end of said piston and cylinder combination and disposed within said inner and outer housings, said member including an elongate slot therein through which said shaft extends.

11. The apparatus of claim 8, wherein said cam means includes a plurality of roller members respectively associated with and bearing against said sidewalls.

12. The apparatus of claim 8, wherein said common fixed axis is defined by a pair of trunnions on opposite sides of said piston and cylinder assembly and bearings in said other ends of said sidewalls within which said trunnions are journalled.

* * * * *